(12) United States Patent
Rollinger et al.

(10) Patent No.: US 10,989,583 B2
(45) Date of Patent: Apr. 27, 2021

(54) METHOD AND SYSTEM FOR DETERMINING A LEVEL OF A FLUID

(71) Applicant: Ford Global Technologies, LLC, Dearborn, MI (US)

(72) Inventors: John Eric Rollinger, Troy, MI (US); Joshua Schumaker, Dearborn, MI (US); Karen Willard, Grosse Pointe Farms, MI (US); James Edward Godden, Troy, MI (US); Robert Milton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/520,214

(22) Filed: Jul. 23, 2019

(65) Prior Publication Data
US 2021/0023939 A1 Jan. 28, 2021

(51) Int. Cl.
*G01F 23/00* (2006.01)
*B60K 15/03* (2006.01)

(52) U.S. Cl.
CPC .......... *G01F 23/0076* (2013.01); *B60K 15/03* (2013.01); *G01F 23/0092* (2013.01); *B60K 2015/03217* (2013.01)

(58) Field of Classification Search
CPC .................. G01F 23/0076; G01F 23/0092
See application file for complete search history.

(56) References Cited

U.S. PATENT DOCUMENTS

2017/0089749 A1* 3/2017 Baker .................. G01C 9/02

\* cited by examiner

*Primary Examiner* — Paul M. West
(74) *Attorney, Agent, or Firm* — Geoffrey Brumbaugh; McCoy Russell LLP

(57) ABSTRACT

A method and a system for indicating more than three different fluid levels in a fluid reservoir is described for a system that includes a fluid level sensor having only two output levels. In one example, the more than three different fluid levels are determined via output of the fluid level sensor and output of one or more sensors that indicate acceleration or orientation of a vehicle.

20 Claims, 6 Drawing Sheets

FIG. 1

METHOD AND SYSTEM FOR DETERMINING A LEVEL OF A FLUID

FIELD

The present description relates to methods and a system for determining an amount of fluid that is stored in a fluid reservoir. The method and systems monitor an output of a binary or two state output sensor to determine one of a plurality of fluid levels that the fluid stored in the fluid reservoir may assume.

BACKGROUND AND SUMMARY

An amount of fluid that is stored in a fluid reservoir may be determined via a fluid level sensor that outputs an analog signal that has a level that varies with an amount of fluid that is stored in the fluid reservoir. By measuring a level that is output by the sensor and inputting the measured level into a transfer function, a level of fluid in the fluid reservoir may be determined. The level of fluid in the reservoir maybe one of nearly an infinite number of fluid levels that may be determined from output of the sensor. For example, the sensor may output a voltage or current that is indicative of $1/16$ of the volume of the reservoir, $1/8$ the volume of the reservoir, $3/4$ of the volume of the reservoir, the volume of the reservoir, $1/100$ of the volume of the reservoir, of any volume in between the previously mentioned volumes. However, fluid level sensors that output a plurality of fluid levels greater than two levels may be cost prohibitive for some applications. Therefore, a fluid level sensor that outputs one of two available states may be applied in place of a sensor that outputs more than two levels to reduce system cost. The fluid level sensor that outputs two states (e.g., fluid present, fluid not present) may be applied to indicate when the fluid reservoir should be filled (e.g., a low fluid level indication is provided via the two state fluid level sensor). However, a two state fluid level sensor that outputs only two different levels may supply insufficient information to indicate when fluid in the fluid reservoir is being consumed before a low fluid level is displayed. Consequently, the owner of the vehicle may have less time to schedule maintenance to replenish the fluid level. Further, it may be difficult to determine under what operating conditions, greater amounts of the fluid are being consumed. For these reasons, a two state fluid level sensor may be inadequate even though it costs less to deploy.

The inventors herein have recognized the above-mentioned issues and have developed a method for determining a fluid level in a fluid reservoir, comprising: receiving output of a fluid level sensor having only two discrete output levels to a controller; receiving vehicle acceleration data to the controller; and adjusting an indication of a fluid level of a fluid reservoir in response to the output of the fluid level sensor and the vehicle acceleration data.

By combining vehicle acceleration data and an output state of a fluid level sensor that outputs one of only two output states at a time, it may be possible to determine three or more fluid levels of a fluid storage reservoir. In particular, the level of vehicle longitudinal and/or lateral acceleration and the output state of the two state fluid level sensor may be the basis for providing a plurality of inferred fluid levels of fluid stored in a fluid storage reservoir. In one example, a vehicle acceleration level that causes the two state fluid level sensor to change state may be the basis for inferring a level of fluid in a fluid storage reservoir. The vehicle acceleration may cause fluid that is stored in the fluid reservoir to move or slosh such that output of the two state fluid level sensor changes. If the level of fluid stored in the fluid storage reservoir is lower, then a change in the operating state of the two state fluid level sensor may be indicated at lower vehicle acceleration rates as compared to if a higher fluid level were in the fluid storage reservoir. Consequently, output of the two state fluid sensor and vehicle acceleration data may be the basis for inferring more than two fluid reservoir levels. For example, fluid reservoir levels of $1/8$ of fluid reservoir full capacity, $1/4$ of fluid reservoir full capacity, $1/2$ of fluid reservoir full capacity, $3/4$ of fluid reservoir full capacity, full fluid reservoir capacity, and levels in between these values may be determined from output of the two state fluid level sensor and vehicle acceleration data.

The present description may provide several advantages. Specifically, the approach may provide increased resolution of an amount of fluid that is stored in a fluid reservoir as compared to output of a two state fluid level sensor. Further, the approach may reduce system cost and complexity by use of a two state fluid level sensor to determine more than three fluid levels of a fluid that is stored in a fluid reservoir. In addition, the approach may be implemented with different types of sensors that indicate vehicle position and/or acceleration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a schematic diagram of an internal combustion engine that includes a fluid reservoir;

DETAILED DESCRIPTION

Figure 1:
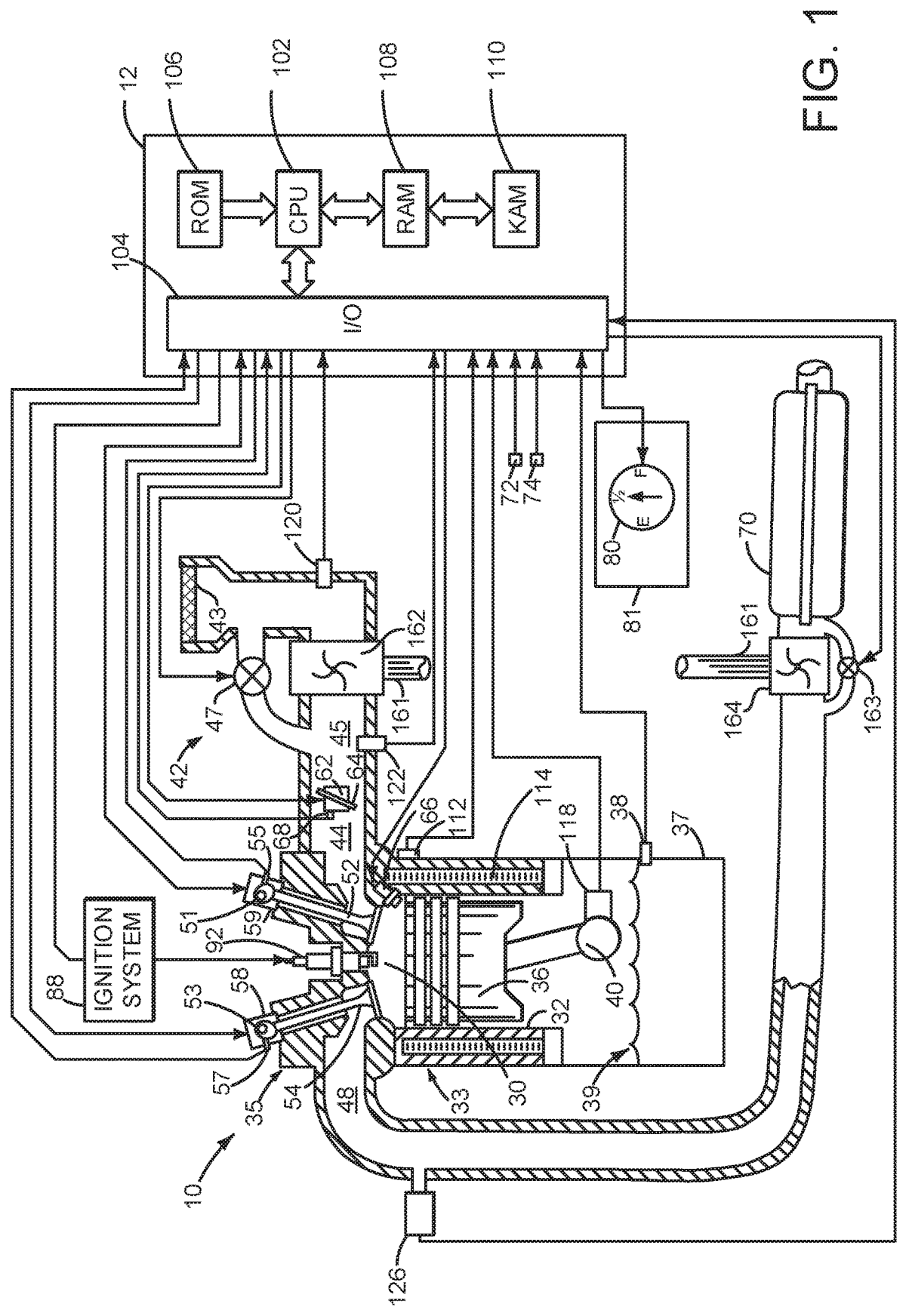
Figure 2:
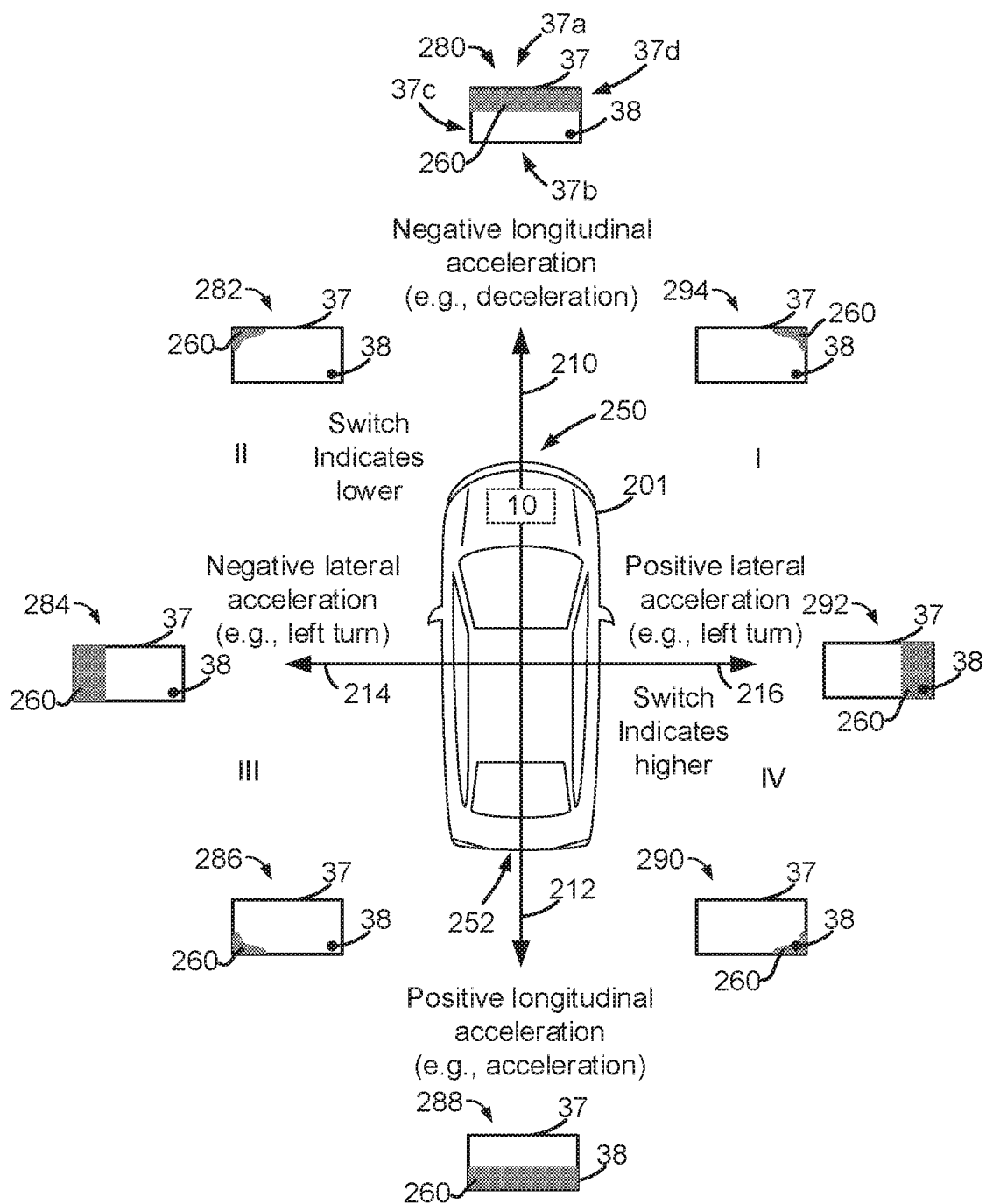
FIG. 2 shows a schematic diagram that indicates directions of vehicle acceleration that may be applied to determine a level of fluid in a fluid reservoir.
Figure 3:
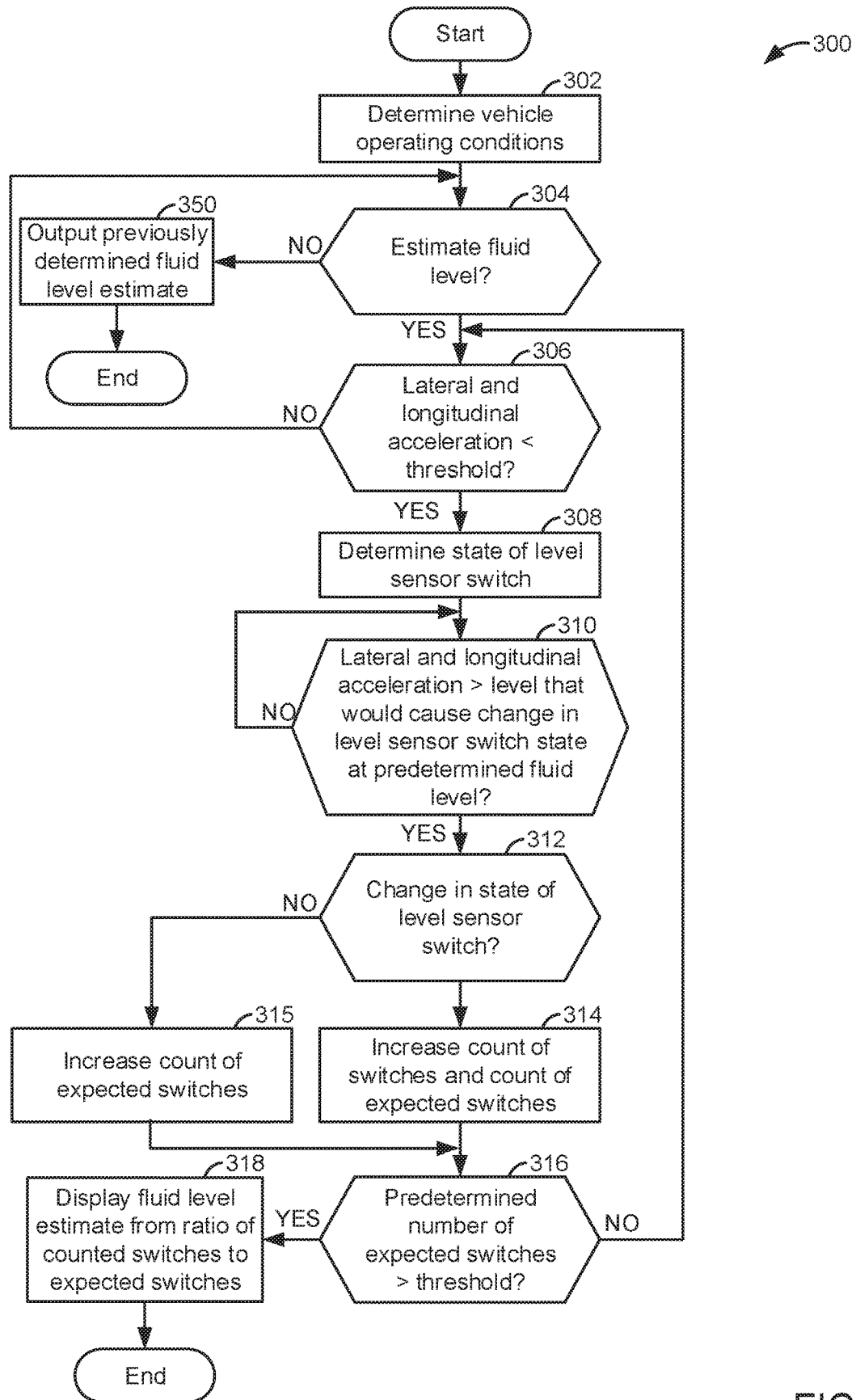
FIG. 3 shows a method for inferring a level of a fluid stored in a fluid storage reservoir that is based on a ratio of actual fluid sensor state changes and expected fluid sensor state changes.

The present description is related to inferring a level of a fluid that is stored in a fluid storage reservoir. In one example, the fluid reservoir may be included as part of an engine as shown in FIG. 1. Specifically, the fluid reservoir may be an oil pan that stores oil for lubricating and cooling an engine. However, the methods described herein are suitable to determine fluid levels in fluid reservoirs other than an oil pan (e.g., windshield wiper fluid levels in a windshield wiper fluid reservoir, fuel level in a fuel tank, etc.). The fluid level may be determined based on output of a two state fluid level sensor and directional vehicle acceleration data as shown in FIG. 2. A method for inferring one of three or more fluid levels stored in a fluid reservoir based on a ratio of fluid level sensor switches to expected fluid level sensor switches is shown in FIG. 3. The method of FIG. 3 may determine a fluid level in a fluid storage reservoir according to the relationship shown in FIG. 4. A method for inferring one of three or more fluid levels stored in a fluid reservoir based on vehicle acceleration is shown in FIG. 5. The method of FIG. 5 may determine a fluid level in a fluid storage reservoir according to the relationship shown in FIG. 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Engine oil pan 37 is shown coupled to block 33 and it retains oil 39 to lubricate and cool engine 10. A two state fluid level sensor 38 outputs a logical high level signal (e.g., greater than 4.5 volts) to indicate a presence of fluid detected at the location of fluid level sensor 38. Alternatively, two state fluid level sensor 38 outputs a logical low level signal (e.g., less than 0.5 volts) to indicate a lack of presence of fluid detected at the location of the fluid level sensor 38. Thus, two state fluid level sensor 38 outputs only two signal levels, one signal level indicating a presence of a fluid at the two state fluid level sensor, and one signal indicating a lack of fluid at the two state fluid level sensor.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; longitudinal vehicle acceleration from accelerometer 72; lateral vehicle acceleration from accelerometer 74; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may output a level of a fluid (e.g., oil) to display 80, which may be included with human/machine interface 81.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example sketch that indicates how a level of fluid sensed by a two state fluid level sensor may be affected via vehicle acceleration is shown. Vehicle 201 includes engine 10 as shown in FIG. 1. A direction of negative longitudinal acceleration is indicated by arrow 210. A direction of positive longitudinal acceleration is indicated by arrow 212. A direction of negative lateral acceleration is indicated by arrow 214. A direction of positive lateral acceleration is indicated by arrow 216. A front of vehicle 201 is indicated via arrow 250. A rear of vehicle 201 is indicated by arrow 252.

The area around vehicle 201 is divided into four quadrants I, II, III, and IV. The first quadrant is indicated by I and it is positioned between arrow 216 and arrow 210. The second quadrant is indicated by II and it is positioned between arrow 214 and arrow 210. The third quadrant is indicated by III and it is positioned between arrow 214 and arrow 212. The fourth quadrant is indicated by IV and it is positioned between arrow 212 and arrow 216. Sketches of oil pans 37 and two state fluid level sensors 38 are shown in each quadrant and in between each quadrant. Each oil pan 37 includes a reference number (e.g., 280-294) so that conditions in the oil pan that are associated with a particular vehicle acceleration may be described. General areas where oil may accumulate during each of the conditions is indicated by shaded areas 260.

Straight line vehicle braking may generate negative longitudinal acceleration in the direction of arrow 210. Straight line acceleration due to a powertrain power source may generate positive longitudinal acceleration in the direction of arrow 212. A left turn may generate negative lateral acceleration in the direction of arrow 214. A right turn may generate positive lateral acceleration in the direction of arrow 216.

In this example, the oil pan 37 is transversely mounted in vehicle 201 and two state fluid level sensor 38 is located in the back right hand side of the oil pan 37. However, in other examples, the two state fluid sensor 38 may be located in other positions within oil pan 37. If the vehicle is decelerating in a straight line, height of fluid in oil pan 37 may decrease at the location of fluid level sensor 38 so that there may be more of a tendency for the fluid level sensor to indicate a lack of fluid depending on the volume of fluid in the oil pan and the rate of deceleration. The oil pan 37 at location 280 may exhibit such conditions. The vehicle deceleration may cause oil to slosh or collect toward the front 37a of oil pan 37 and to exit or leave the rear 37b of oil pan 37. If the vehicle is accelerating in a straight line, height of fluid in oil pan 37 may increase at the location of fluid level sensor 38 so that there may be more of a tendency for the fluid level sensor to indicate a fluid depending on the volume of fluid in the oil pan and the rate of acceleration. The oil pan 37 at location 288 may exhibit such conditions. The vehicle acceleration may cause oil to slosh or collect toward the rear 37b of oil pan 37 and to exit or leave the front 37a of oil pan 37.

During conditions when vehicle 201 is undergoing a left turn, height of fluid in oil pan 37 may decrease at the location of fluid level sensor 38 so that there may be more of a tendency for the fluid level sensor to indicate a lack of fluid depending on the volume of fluid in the oil pan and the rate of lateral acceleration since sensor 38 is mounted on the right side of oil pan 37. The oil pan 37 at location 284 may exhibit such conditions. The lateral acceleration may cause oil to slosh or collect toward the left side 37c of oil pan 37 and to exit or leave the right side 37d of oil pan 37.

During conditions when vehicle 201 is undergoing a right turn, height of fluid in oil pan 37 may increase at the location of fluid level sensor 38 so that there may be more of a tendency for the fluid level sensor to indicate fluid depending on the volume of fluid in the oil pan and the rate of lateral acceleration since sensor 38 is mounted on the right side of oil pan 37. The oil pan 37 at location 292 may exhibit such conditions. The lateral acceleration may cause oil to slosh or collect toward the right side 37d of oil pan 37 and to exit or leave the left side 37c of oil pan 37.

During conditions when vehicle 201 is undergoing deceleration with negative lateral acceleration, such as braking during a left turn, height of fluid in oil pan 37 may decrease at the location of fluid level sensor 38 so that there may be more of a tendency for the fluid level sensor to indicate a lack of fluid depending on the volume of fluid in the oil pan and the rates of deceleration and lateral acceleration since sensor 38 is mounted on the right side of oil pan 37. The oil pan 37 at location 282 may exhibit such conditions. The lateral acceleration and the deceleration may cause oil to slosh or collect toward the front 37a and left side 37c of oil pan 37 and to exit or leave the rear 37b and right side 37d of oil pan 37.

During conditions when vehicle 201 is undergoing acceleration with negative lateral acceleration, such as accelerating during a left turn, height of fluid in oil pan 37 may tend to decrease at the location of fluid level sensor 38 due to the lateral acceleration and tend to increase due to the vehicle acceleration so that there may be more of a tendency for the fluid level sensor to indicate a fluid or lack of fluid depending on the volume of fluid in the oil pan and the rates of acceleration and lateral acceleration since sensor 38 is mounted on the right side of oil pan 37. The oil pan 37 at location 286 may exhibit such conditions. The lateral acceleration and the acceleration may cause oil to slosh or collect toward the rear 37b and left side 37c of oil pan 37 and to exit or leave the front 37a and right side 37d of oil pan 37.

During conditions when vehicle 201 is undergoing deceleration with positive lateral acceleration, such as braking during a right turn, height of fluid in oil pan 37 may change at the location of fluid level sensor 38 so that there may be a tendency for the fluid level sensor to indicate a fluid or a lack of fluid depending on the volume of fluid in the oil pan and the rates of deceleration and lateral acceleration since sensor 38 is mounted on the right side of oil pan 37. The oil pan 37 at location 294 may exhibit such conditions. The lateral acceleration and the deceleration may cause oil to slosh or collect toward the front 37a and right side 37d of oil pan 37 and to exit or leave the rear 37b and left side 37c of oil pan 37.

During conditions when vehicle 201 is undergoing acceleration with positive lateral acceleration, such as accelerating during a right turn, height of fluid in oil pan 37 may tend to increase at the location of fluid level sensor 38 due to the lateral acceleration and tend to increase due to the vehicle acceleration so that there may be more of a tendency for the fluid level sensor to indicate a fluid depending on the volume of fluid in the oil pan and the rates of acceleration and lateral acceleration since fluid level sensor 38 is mounted on the right side of oil pan 37. The oil pan 37 at location 290 may exhibit such conditions. The lateral acceleration and the acceleration may cause oil to slosh or collect toward the rear 37b and right side 37d of oil pan 37 and to exit or leave the front 37a and left side 37c of oil pan 37.

Thus, positive longitudinal acceleration and negative longitudinal acceleration as well as lateral acceleration may tend to affect whether or not fluid level sensor 38 observes or does not observe fluid. The level of fluid that is observed at the location of fluid sensor 38 may change with vehicle acceleration levels. The methods described herein take advantage of this recognition.

The system of FIGS. 1 and 2 provides for a vehicle system, comprising: a fluid reservoir including a fluid level sensor having only two discrete output levels; one or more sensors that may indicate a position of a vehicle; and a controller including executable instructions stored in non-transitory memory to indicate a fluid level in the fluid reservoir in response to output of the fluid level sensor and the one or more sensors indicating the position of the vehicle. The vehicle system further comprises instructions to capture a vehicle acceleration rate at a time that an output of the fluid level sensor changes state. The vehicle system includes where the one or more sensors include one or more accelerometers. The vehicle system includes where the fluid level is indicated via the controller as three or more different fluid levels.

Referring now to FIG. 3, a method for operating a vehicle is shown. At least portions of method 300 may be implemented as executable controller instructions stored in non-transitory memory. Method 300 may operate in cooperation with the system of FIGS. 1 and 2. Additionally, portions of method 300 may be actions taken in the physical world to transform an operating state of an actuator or device. The method of FIG. 3 may be incorporated into the system of FIGS. 1 and 2 as executable instructions stored in non-transitory memory. The method of FIG. 3 determines a level of fluid stored in a fluid reservoir (e.g., an oil level in an oil pan, a fuel level in a fuel tank, a fluid level in a windshield wiper tank, etc.).

At 302, method 300 determines vehicle operating conditions. Vehicle operating conditions may include but are not limited to vehicle accelerations (e.g., positive longitudinal acceleration, negative longitudinal acceleration, negative lateral, positive lateral), vehicle speed, engine speed, ambient air temperature, and engine temperature. Method 300 may determine the various vehicle operating conditions based on output of sensors. Method 300 proceeds to 304.

At 304, method 300 judges whether or not to estimate a fluid level in a tank or reservoir (e.g., an oil pan). Method 300 may judge to estimate a fluid level in a tank or reservoir when select conditions are met. For example, method 300 may judge to estimate or infer a fluid level in a fluid tank or reservoir when engine temperature is greater than a threshold or after an engine has been operating for a predetermined amount of time. Further, method 300 may judge to estimate or infer the fluid level in the fluid tank or reservoir in response to other vehicle operating conditions such as in response to a request to start the engine or when ambient temperature is greater than a threshold temperature. If method 300 judges to estimate or infer the fluid level, then the answer is yes and method 300 proceeds to 306. Otherwise, the answer is no and method 300 proceeds to 350.

At 350, method 300 displays a previously determined level of the fluid. The previously determined level may have been stored to controller memory. Method 300 proceeds to exit.

At 306, method 300 judges if lateral vehicle acceleration is greater than a threshold or if vehicle longitudinal acceleration (e.g., positive or negative) magnitude is greater than a threshold. The threshold acceleration levels may be empirically determined and stored in controller memory. If method 300 judges that lateral vehicle acceleration is greater than a threshold or if vehicle longitudinal acceleration (e.g., positive or negative) magnitude is greater than a threshold, then the answer is yes and method 300 proceeds to 308. Otherwise, the answer is no and method 300 returns to 304.

At 308, method 300 determines the output of the two state fluid level sensor. In one example, method 300 may determine the presence of fluid in the fluid reservoir when the output of the fluid level sensor is a logical high level (e.g., greater than 4.5 volts). Method 300 may determine the absence of fluid in the fluid reservoir when the output of the fluid level sensor is a logical low level (e.g., less than 0.5 volts). The output of the fluid level sensor may be sensed via the controller. Method 300 proceeds to 310.

At 310, method 300 judges if the lateral acceleration is greater than a threshold level that would cause a change in state of the two state fluid level sensor during conditions when a predetermined level of fluid is stored in the fluid reservoir or tank. Further, method 300 judges if the longitudinal acceleration (e.g., positive or negative) magnitude is greater than a threshold level that would cause a change in state of the two state fluid level sensor during conditions when a predetermined level of fluid is stored in the fluid reservoir or tank. If either condition is present, the answer is yes and method 300 proceeds to 312. Otherwise, the answer is no and method 300 returns to 310.

At 312, method 300 judges if there has been an actual change in the output state of the fluid level sensor that has occurred within a predetermined amount of time before or after the indication of acceleration at 310 was determined to be likely to result in a state change of the two state fluid level sensor. For example, method 300 judges of the output of the fluid level sensor changes from a logical high state to a logical low state or vice-versa. If so, the answer is yes and method 300 proceeds to 314. Otherwise, the answer is no and method 300 proceeds to 315.

At 314, method 300 increases a count of the number of switches of the two state fluid level sensor by a value of one. Method 300 also increases a count of the number of expected switches of the two state fluid level sensor by a value of one. Both values are increased because an actual change in the output state of the fluid level sensor was observed and expected. Method 300 proceeds to 316.

At 316, method 300 judges if the expected number or count of two state fluid level sensor switches (e.g., the two state fluid level sensor output changes from low to high or from high to low) has exceeded a threshold number. If so, the answer is yes and method 300 proceeds to 318. Otherwise, the answer is no and method 300 returns to 306.

At 318, method 300 determines a ratio of actual count or number of two state fluid level sensor switches to an expected count or number of two state fluid level sensor switches. The two state fluid level sensor switch ration may be expressed as:

$$\text{Sen\_sw\_ratio} = \frac{\text{act\_switches}}{\text{Ex\_switches}}$$

where Sen_sw_ratio is the sensor switch ratio of actual two state fluid level sensor switches to expected two state fluid level sensor switches, act_switches is the actual total number of two state fluid sensor switches, and Ex_switches is the expected total number of two state sensor switches.

Once the sensor switching ratio is determined, the sensor switching ratio and the acceleration determined at 304 are arguments input to a function or transfer function (e.g., the function shown in FIG. 4) that defines a relationship between the sensor switching ratio, vehicle acceleration (e.g., negative lateral, positive lateral, positive longitudinal, or negative longitudinal), and a fluid level that is stored in the fluid reservoir (e.g., oil pan, fuel tank, wiper fluid reservoir). The function or transfer function outputs the estimate of fluid level in the fluid reservoir. In some examples, method 300 may clear or set the zero the number of counts of fluid sensor switches and the expected number of counts of fluid sensor switches to zero after the switching ratio is determined.

Method 300 may then display the fluid level that is stored in the fluid reservoir on a display panel and/or a human machine interface. In addition, method 300 may adjust one or more engine torque actuators in response to the estimated fluid level stored in the fluid reservoir. In one example, if the estimated fluid level stored in the fluid reservoir is less than a threshold, the amount of torque that the engine may produce may be limited to reduce the possibility of engine degradation. For example, if the estimated amount of fluid that is stored in the engine oil pan is less than a threshold level, engine torque output may be limited to less than seventy percent of the engine's full torque output capacity. The engine torque may be limited by limiting the engine throttle opening amount to less than a threshold amount. Further, the engine fuel injectors may be limited to inject less than a threshold amount of fuel. The engine's torque output may be limited so that vehicle acceleration may be reduced such that less variation in engine oil level may be observed at the engine oil pump pickup tube. In addition, other engine torque actuators may be limited in their range of operation to limit engine torque to less than a threshold amount of torque. Method 300 proceeds to exit.

At 315, method 300 increases the count of the number of expected switches of the two state fluid level sensor by a value of one. Method 300 does not increase the count of the actual number of switches of the two state fluid level sensor because the two state fluid level sensor has not changed its output state. Method 300 proceeds to 316.

In this way, method 300 may estimate a level of fluid that is stored in a fluid storage tank or reservoir. Method 300 may provide estimate that range from ¹⁄₁₆ of the fluid reservoir's capacity (or less) to full fluid reservoir capacity. Method 300 may output tens or hundreds of level estimates that range from ¹⁄₁₆ capacity of the fluid reservoir to full reservoir capacity. For example, method 300 may output fluid level estimates of ¼, ⅓, ⅜, ⁵⁄₁₆, ¾, ⅞, etc. of the fluid reservoir's capacity. In addition, method 300 may multiply the fluid level estimate by the fluid reservoir capacity to determine a volume of fluid that is stored in the fluid reservoir.

Figure 4:
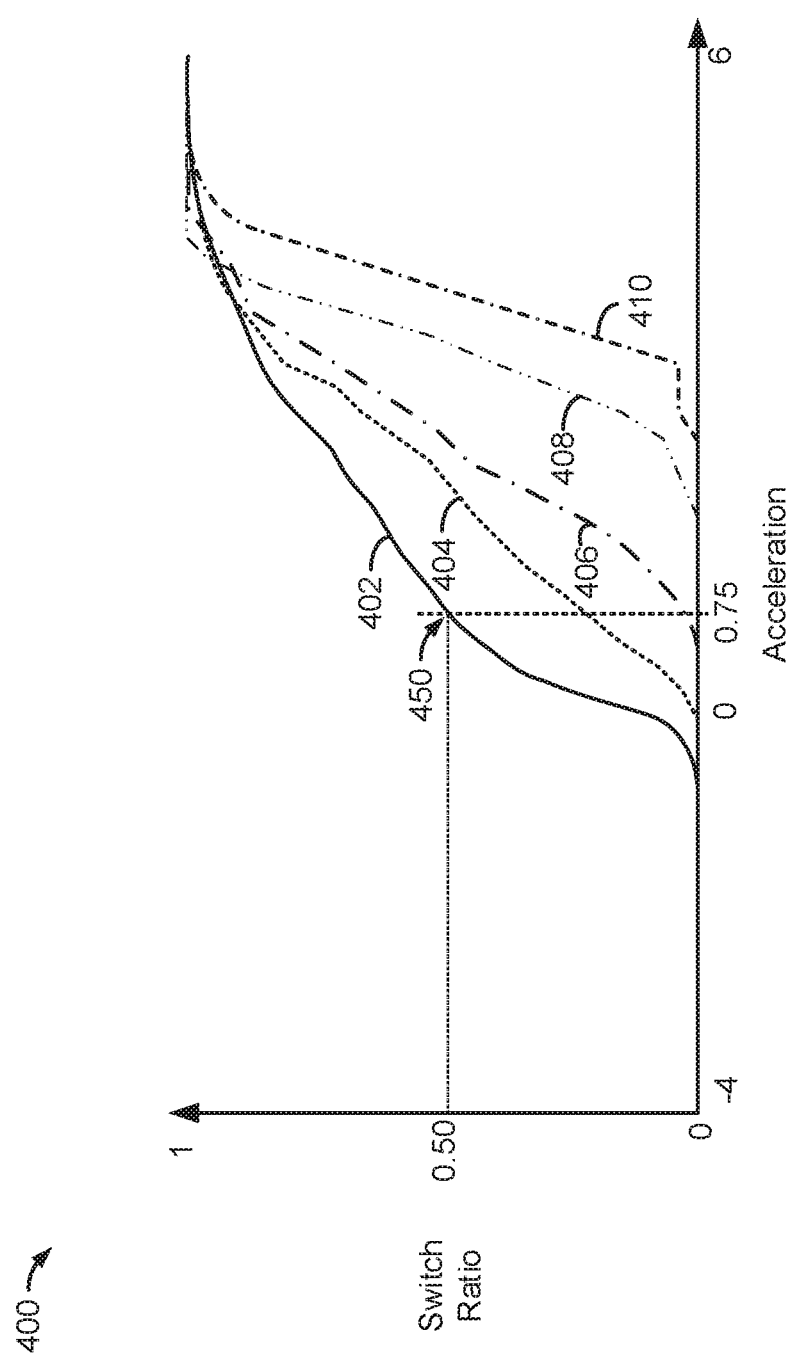
FIG. 4 shows an example relationship between vehicle acceleration, ratio of fluid level sensor switches to expected fluid level sensor switches, and a fluid level in a fluid reservoir.
Figure 5:
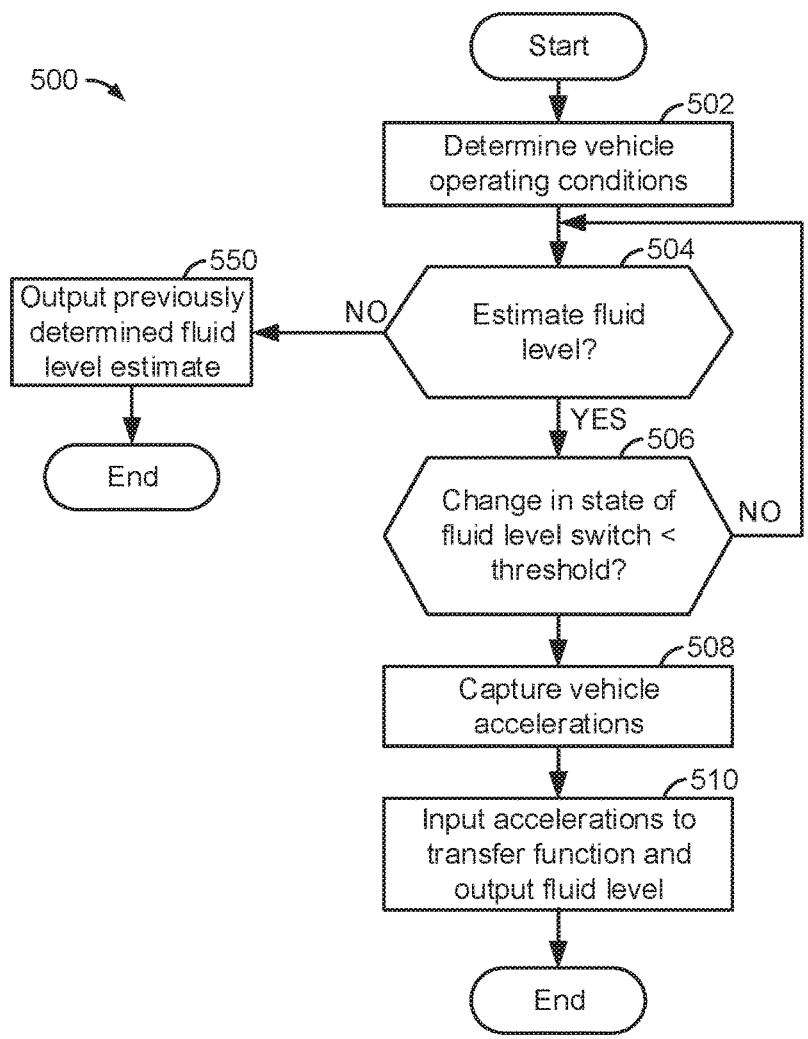
FIG. 5 shows a method for inferring a level of a fluid stored in a fluid storage reservoir that is based on an actual fluid sensor state change and vehicle acceleration.

Referring now to FIG. 4, an example relationship between two state fluid sensor switching ratio, vehicle acceleration, and volume of fluid stored in the fluid reservoir is shown. Relationship 400 includes a vertical axis that represents the two state fluid sensor switching ratio. The horizontal axis represents the vehicle acceleration (e.g., lateral or longitudinal). Curves 402-410 represent levels or amounts of fluid in the fluid storage reservoir or tank. Thus, for a pair including a two state fluid sensor switch ratio and a vehicle acceleration rate, a fluid level may be determined at the location that the two state fluid sensor switch ratio and a vehicle acceleration intersect. For example, if the two state fluid sensor switch ratio is 0.5 and the vehicle acceleration is 0.75 meters/s$^2$, then the fluid level is indicated by curve 402. Curve 402 may represent a lower fluid level (e.g., ¼ of the fluid reservoir capacity) than curve 410 (e.g., ⅝ of the fluid reservoir capacity).

In this way, the relationship or transfer function shown in FIG. 4 may be the basis for determining the fluid level stored in a fluid reservoir or tank. It may be observed that the two state fluid level sensor switching ratio may increase at lower vehicle accelerations when lower levels of fluid are stored in the fluid reservoir. The lower fluid level may cause the two state fluid level switch to change state at lower vehicle acceleration levels as compared to higher fluid levels that may not cause the state of the two state fluid level switch to change until higher vehicle acceleration rates are present.

Referring now to FIG. 5, a second method for operating a vehicle is shown. At least portions of method 500 may be implemented as executable controller instructions stored in non-transitory memory. Method 500 may operate in cooperation with the system of FIGS. 1 and 2. Additionally, portions of method 500 may be actions taken in the physical world to transform an operating state of an actuator or device. The method of FIG. 5 may be incorporated into the system of FIGS. 1 and 2 as executable instructions stored in non-transitory memory. The method of FIG. 5 determines a level of fluid stored in a fluid reservoir (e.g., an oil level in an oil pan, a fuel level in a fuel tank, a fluid level in a windshield wiper tank, etc.).

At 502, method 500 determines vehicle operating conditions. Vehicle operating conditions may include but are not limited to vehicle accelerations (e.g., positive or negative longitudinal, lateral positive, lateral negative), vehicle speed, engine speed, ambient air temperature, and engine temperature. Method 500 may determine the various vehicle operating conditions based on output of sensors. Method 500 proceeds to 504.

At 504, method 500 judges whether or not to estimate a fluid level in a tank or reservoir (e.g., an oil pan). Method 300 may judge to estimate a fluid level in a tank or reservoir when select conditions are met. For example, method 500 may judge to estimate or infer a fluid level in a fluid tank or reservoir when engine temperature is greater than a threshold or after an engine has been operating for a predetermined amount of time. Further, method 500 may judge to estimate or infer the fluid level in the fluid tank or reservoir in response to other vehicle operating conditions such as in response to a request to start the engine or when ambient temperature is greater than a threshold temperature. If method 500 judges to estimate or infer the fluid level, then the answer is yes and method 500 proceeds to 506. Otherwise, the answer is no and method 500 proceeds to 550.

At 550, method 500 displays a previously determined level of the fluid. The previously determined level may have been stored to controller memory. Method 500 proceeds to exit.

At 506, method 500 judges if there has been a change in the output state of the two state fluid level sensor. The output state of the two state fluid level sensor may be determined to have changed if the output switches from a high level to a low level. Alternatively, the output state of the two state fluid level sensor may be determined to have changed if the output switches from a low level to a high level. If method 500 judges that the output of the two state fluid level sensor has changed state, then the answer is yes and method 500 proceeds to 508. Otherwise, the answer is no and method 500 returns to 504.

At 508, method 500 captures and stores the vehicle acceleration magnitudes (e.g., lateral or longitudinal) that caused or resulted in the state change of the two state fluid level sensor output. Method 500 proceeds to 510.

At 510, method 500 references a function or relationship that describes a fluid level that is stored in a fluid level reservoir via the vehicle acceleration determined at 508. The function outputs an estimated fluid level that corresponds to the vehicle acceleration rate. In one example, the function or relationship may be as described in FIG. 6. Further, the values that are included in the function may be empirically determined via monitoring fluid levels in a fluid reservoir and determining at what level and vehicle acceleration rate that the two state fuel level switch changes state.

Method 500 may then display the fluid level that is stored in the fluid reservoir on a display panel and/or a human machine interface. In addition, method 500 may adjust one or more engine torque actuators in response to the estimated fluid level stored in the fluid reservoir. In one example, if the estimated fluid level stored in the fluid reservoir is less than a threshold, the amount of torque that the engine may produce may be limited to reduce the possibility of engine degradation. For example, if the estimated amount of fluid that is stored in the engine oil pan is less than a threshold level, engine torque output may be limited to less than seventy percent of the engine's full torque output capacity. The engine torque may be limited by limiting the engine throttle opening amount to less than a threshold amount. Further, the engine fuel injectors may be limited to inject less than a threshold amount of fuel. The engine's torque output may be limited so that vehicle acceleration may be reduced such that less variation in engine oil level may be observed at the engine oil pump pickup tube. In addition, other engine torque actuators may be limited in their range of operation to limit engine torque to less than a threshold amount of torque. Method 500 proceeds to exit.

Figure 6:
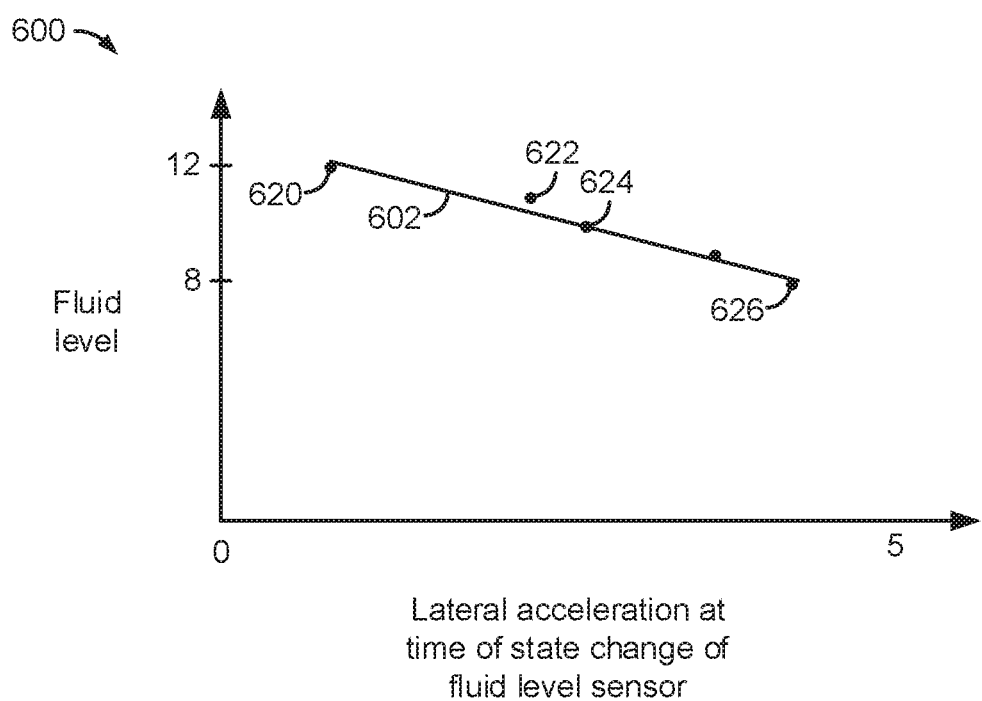
FIG. 6 shows an example relationship between vehicle acceleration, a fluid level sensor switch, and fluid level in a fluid reservoir.

Referring now to FIG. 6, an example relationship between an acceleration rate at which a two state fluid sensor switches and volume of fluid stored in the fluid reservoir is shown. Relationship 600 includes a vertical axis that represents the volume of fluid stored in the fluid reservoir. The horizontal axis represents the vehicle acceleration magnitude (e.g., lateral or longitudinal acceleration). Line 602 represents the relationship between a vehicle acceleration level at which a two state fluid level sensor changes its output state and a fluid level in a fluid reservoir. The equation of line 602 may be determined via fitting a curve to data points 620-628. Thus, for a vehicle acceleration rate at which a two state fluid level sensor changes its output state, a unique fluid level in a fluid reservoir may be determined. For example, if the two state fluid sensor switches at 1.0 meters/s$^2$, then the fluid level may be 11 liters. Similarly, if the two fluid sensor switches at 4.0 meters/s$^2$, then the fluid level may be 7.6 liters. In this way, the relationship or transfer function shown in FIG. 6 may be the basis for determining the fluid level stored in a fluid reservoir or tank.

Thus, the method of FIGS. 5 and 6 provides for a method for determining a fluid level in a fluid reservoir, comprising: receiving output of a fluid level sensor having only two discrete output levels to a controller; receiving vehicle acceleration data to the controller; and adjusting an indication of a fluid level of a fluid reservoir in response to the output of the fluid level sensor and the vehicle acceleration data. The method includes where adjusting the indication of the fluid level includes adjusting the indication to more than three different levels. The method includes where the acceleration data includes longitudinal and lateral acceleration data. The method includes where a first of the only two discrete output levels indicates presence of a fluid. The method includes where a second of the only two discrete output levels indicates an absence of the fluid. The method includes where the indication of the fluid level of the fluid reservoir is provided via a human/machine interface. The method further comprises indicating degradation of the fluid level sensor in response to a lack of a change in state of the fluid level sensor and the vehicle acceleration data indicating a change in a vehicle acceleration rate. The method further comprises adjusting an engine actuator in response to the output of the fluid level sensor and the vehicle acceleration data.

The methods of FIGS. 3 and 5 also provide for a method for determining a fluid level in a fluid reservoir, comprising: receiving output of a fluid level sensor having only two discrete output levels to a controller; receiving vehicle acceleration data to the controller; adjusting an indication of a fluid level of a fluid reservoir according to a ratio of a count of state changes of the fluid level sensor to a count of expected state changes of the fluid level sensor. The method includes where the count of expected state changes is based on the vehicle acceleration data. The method further comprises determining the fluid level from the ratio and the vehicle acceleration data. The method further comprises adjusting an engine actuator in response to the indication of the fluid level. The method includes where the engine actuator is a torque actuator. The method includes where the torque actuator is adjusted to limit engine torque output. The method includes where the vehicle acceleration data includes longitudinal acceleration and lateral acceleration. The method includes where the fluid level sensor is an oil level sensor.

In another representation, the method of FIGS. 3 and 5 provide for a method for determining a fluid level in a fluid reservoir, comprising: receiving output of a fluid level sensor having only two discrete output levels to a controller; receiving vehicle acceleration data to the controller; and adjusting an indication of a fluid level of a fluid reservoir according to a vehicle acceleration rate that is within a threshold amount of time that an output of the fluid level sensor changes state. The method further comprises adjusting an engine actuator in response to the fluid level of the fluid reservoir. The method includes where the engine actuator is an engine throttle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for determining a fluid level in a fluid reservoir, comprising:
   receiving output of a fluid level sensor having only two discrete output levels to a controller;
   receiving vehicle acceleration data to the controller; and
   adjusting an indication of a fluid level of a fluid reservoir in response to a count of state changes of the fluid level sensor and a count of expected state changes of the fluid level sensor, wherein the count of state changes of fluid level sensor is based on the output of the fluid level sensor, and the count of expected state changes of the fluid level sensor is based on the vehicle acceleration data.

2. The method of claim 1, where adjusting the indication of the fluid level includes adjusting the indication to one of more than three different levels.

3. The method of claim 1, where the vehicle acceleration data includes longitudinal and lateral acceleration data.

4. The method of claim 1, where a first of the only two discrete output levels indicates presence of a fluid.

5. The method as claimed in claim 4, where a second of the only two discrete output levels indicates an absence of the fluid.

6. The method of claim 1, where the indication of the fluid level of the fluid reservoir is provided via a human/machine interface.

7. The method of claim 1 further comprising, indicating degradation of the fluid level sensor in response to a lack of a change in state of the fluid level sensor and the vehicle acceleration data indicating a change in a vehicle acceleration rate.

8. The method of claim 1, further comprising adjusting an engine actuator in response to the output of the fluid level sensor and the vehicle acceleration data.

9. A method for determining a fluid level in a fluid reservoir, comprising:
   receiving output of a fluid level sensor having only two discrete output levels to a controller;
   receiving vehicle acceleration data to the controller; and
   adjusting an indication of a fluid level of a fluid reservoir according to a ratio of a count of state changes of the fluid level sensor to a count of expected state changes of the fluid level sensor.

10. The method of claim 9, where the count of expected state changes is based on the vehicle acceleration data.

11. The method of claim 10, further comprising determining the fluid level from the ratio and the vehicle acceleration data.

12. The method of claim 9, further comprising adjusting an engine actuator in response to the indication of the fluid level.

13. The method of claim 12, where the engine actuator is a torque actuator.

14. The method of claim 13, where the torque actuator is adjusted to limit engine torque output.

15. The method of claim 9, where the vehicle acceleration data includes longitudinal acceleration and lateral acceleration.

16. The method of claim 9, where the fluid level sensor is an oil level sensor.

17. A vehicle system, comprising:
   a fluid reservoir including a fluid level sensor having only two discrete output levels;
   one or more sensors that may indicate acceleration of a vehicle; and
   a controller including executable instructions stored in non-transitory memory to indicate a fluid level in the fluid reservoir in response to a count of state changes of the fluid level sensor and a count of expected state changes of the fluid level sensor, wherein the count of state changes of the fluid level sensor is based on output of the fluid level sensor, and the count of expected state changes of the fluid level sensor is based on the one or more sensors indicating the acceleration of the vehicle.

18. The vehicle system of claim 17, further comprising instructions to capture a vehicle acceleration rate at a time that an output of the fluid level sensor changes state.

19. The vehicle system of claim 17, where the one or more sensors include one or more accelerometers.

20. The vehicle system of claim 17, where the fluid level is indicated via the controller as one of three or more different fluid levels.

* * * * *